Dec. 19, 1939.    R. E. SMITH    2,183,824
SHAFT EXTENSION AND COUPLING THEREFOR
Filed May 27, 1938
FIG. 1.
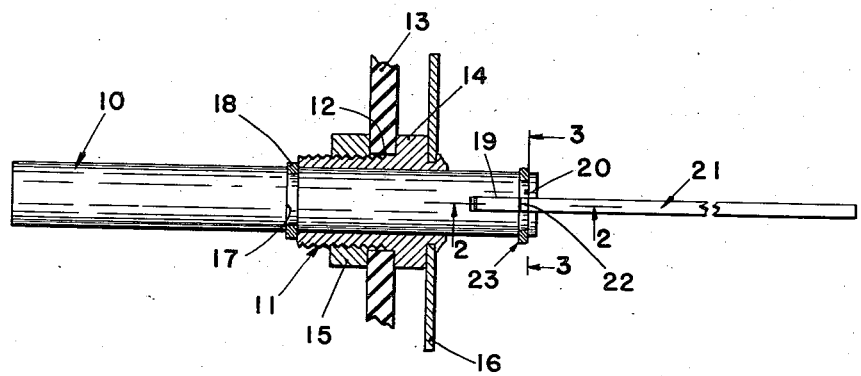
FIG. 6.  FIG. 3.  FIG. 2.
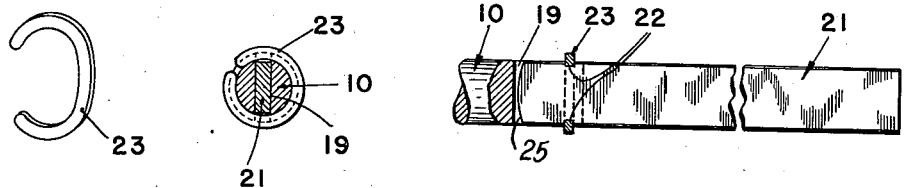
FIG. 7.  FIG. 4.  FIG. 5.
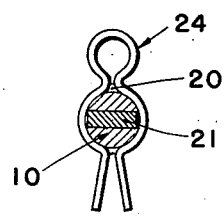
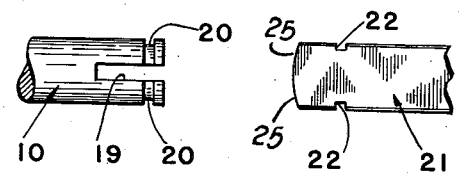
INVENTOR
RAYMOND E. SMITH
BY John W. Michael
ATTORNEY Patented Dec. 19, 1939

2,183,824

UNITED STATES PATENT OFFICE 2,183,824

SHAFT EXTENSION AND COUPLING THEREFOR

Raymond E. Smith, Milwaukee, Wis., assignor to Globe-Union Inc., Milwaukee, Wis., a corporation of Delaware Application May 27, 1938, Serial No. 210,317

3 Claims. (Cl. 287—103)

This invention relates to an improvement in extension shafts and couplings therefor especially designed and adapted for use in connection with radio control devices such as volume controls, switches and the like.

One of the principal objects of the invention is to provide an extension shaft and coupling which greatly facilitates replacement or installation of control devices in a radio receiver and yet provides a strong, secure and steady assembly insuring convenient, reliable and uniform operation of the device with which it is associated.

Another object of the invention is to provide a device of this character which is of simple, compact and closely organized construction, which is conveniently adaptable to a variety of installations, which is readily and easily assembled and disassembled and which may be economically manufactured from materials and by means of facilities ordinarily available.

Other objects and advantages reside in certain novel features of the construction, arrangement and combination of parts which will be hereinafter more fully described and particularly pointed out in the appended claims, reference being had to the accompanying drawing forming a part of this specification, and in which:

Figure 1 is a fragmentary view partly in side elevation and partly in longitudinal vertical section showing one embodiment of the present invention;

Figure 2 is a fragmentary view in longitudinal section taken on line 2—2 of Figure 1;

Figure 3 is a view in transverse vertical cross section taken on line 3—3 of Figure 1;

Figure 4 is a fragmentary view in elevation showing the slotted and grooved end of one of the shafts;

Figure 5 is a similar view showing the flattened and notched end of the other of said shafts;

Figure 6 is a detail perspective view of the split retaining ring shown in Figures 1 to 3 for holding the shafts against axial movement with respect to each other; and Figure 7 is a view in cross section similar to Figure 3 but showing a hairpin type of spring fastener employed in lieu of the split retaining ring.

Referring to the drawing, the numeral 10 designates a metal shaft of circular cross section and supported for rotation in a bushing 11. The bushing 11 extends through an opening 12 in an insulating panel or support 13. A flange 14 integral with one end of the bushing engages one side of the panel 13 around the margin of its opening 12 and a nut 15 threaded on the bushing engages the opposite side of the panel and coacts with the flange 14 to secure the bushing 11 in position.

In some installations the bushing 11 also carries a bracket plate 16 which aids in the support of associated instrumentalities.

The shaft 10 has an annular groove 17 receiving a split snap ring 18 engageable with one end of the bushing 11 to prevent axial motion of the shaft 10 in one direction. Usually similar means (not shown) is also provided to prevent axial motion of the shaft 10 in the other direction also.

One end of the shaft 10 is provided with a transverse groove 19, preferably extending diametrically of the shaft and of rectangular shape. The slotted end of the shaft also has circumferentially extending grooves 20 intersecting the slot 19.

A cooperable shaft 21 is provided and in the construction shown is constituted of flat stock. It is not essential that the shaft 21 be of flat stock throughout its extent as the body of the shaft may take various shapes and cross sections. It is necessary however that the end of the shaft 21 adjacent the shaft 10 be flattened or equivalently shaped to adapt it to be interfitted snugly or frictionally with the slot 19 of shaft 10. The interfitting engagement between the shafts 21 and 10 is such as to transmit torque and preclude relative angular movement. The end portion of the shaft 21 received in slot 19 is provided with peripherial notches 22 which register with grooves 20 in the assembly. A fastening device is fitted or received in the registering grooves and notches to hold the shafts 10 and 21 against relative axial motion.

In the form of the invention shown in Figures 1 to 3 and 6, the fastening device takes the form of a resilient retaining ring 23 which is clinched into the grooves 20 and notches 22 in the manner illustrated in Figures 1 to 3 until the inner periphery of the ring lies well within said groove 20 and thereby positively holds the shaft 21 against axial displacement relative to the shaft 10. In the form of the invention illustrated in Figure 7 this fastening or retaining device takes the form of a hairpin spring 24 which is snapped into the grooves 20 and notches 22 and exerts a similar action. If desired the ring 23 or the spring 24 shown in Figs. 3 and 7, respectively, may be fitted within the groove 20 before the shaft sections are assembled and with this in mind the shaft section 21 may have its end portion beveled or rounded as at 25 to provide opposed terminal camming portions which, as the shaft sections are engaged, will abut against the inner periphery of the ring 23 or spring 24 to expand the same, whereby to permit telescopic engagement of the shaft sections to an extent such as to bring the notches 22 in registry with the groove 20, at which time the ring or spring member will snap into the notches and effectively lock the shaft sections against separation.

In the construction illustrated, the shaft 10 is usually the driving shaft and the shaft 21 the driven shaft, although, of course, this relation may be reversed. Where the shaft 10 is the driving shaft it is equipped as a rule with an operating knob or a similar device and the shaft 21 is used to actuate a switch, such as a wave band switch or volume control or any other similar control device employed on radio receivers. This construction greatly facilitates replacement or even factory installation of control devices in radio receivers. The shafts 21 and 10 may be provided in suitable lengths or may be cut to length, and yet in the assembly, a strong and secure, as well as a steady operation or actuation, is insured.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. A control shaft coupling for adjustable electrical devices comprising a pair of shaft sections having interlocking portions for connecting them together end to end, said portions comprising non-circular interfitting parts fitting together to form a substantially circular joint, said interfitting parts being correspondingly grooved to provide a circumferential groove in said joint, a resilient split ring in said groove locking said sections together, the inner periphery of said ring lying completely within the groove.

2. A control shaft coupling for adjustable electrical devices comprising a pair of shaft sections of substantially the same diameter having interlocking portions for connecting them together end-to-end, one of said portions having a slot extending back from its end and having a groove extending around said slotted region, the other of said portions comprising a tongue fitting into said slot, said tongue having edge notches in register with said groove when said shafts are in interlocked relation, and a resilient split ring in said registering groove and notches locking said shafts together, the inner periphery of said ring lying completely within said groove.

3. A control shaft coupling for adjustable electrical devices comprising a pair of shaft sections of substantially the same diameter having interlocking portions for connecting them together end-to-end, one of said portions having a slot extending back from its end and having a groove extending around said slotted region, a resilient split ring seated in said groove, the other of said portions comprising a tongue fitting into said slot, said tongue having terminal cam portions engageable with the inner periphery of said ring through said slot to expand the ring as the tongue is fitted into said slot, said tongue also having edge notches in register with said groove and receiving said ring when said shafts are in interlocked relation, whereby to lock the shaft sections together.

RAYMOND E. SMITH.